United States Patent [19]

Trinkwalder, Jr.

[11] 3,991,785
[45] Nov. 16, 1976

[54] FLOW REGULATOR VALVE
[75] Inventor: Joseph C. Trinkwalder, Jr., North Tonawanda, N.Y.
[73] Assignee: Sherwood-Selpac Corporation, Lockport, N.Y.
[22] Filed: Apr. 28, 1975
[21] Appl. No.: 572,505

[52] U.S. Cl............................. 137/494; 137/484.8; 137/DIG. 9; 128/142.2
[51] Int. Cl.² ....................................... F16K 31/12
[58] Field of Search............ 137/494, DIG. 9, 484.2, 137/484.4, 484.6, 484.8; 128/142.2; 251/251

[56] References Cited
UNITED STATES PATENTS

| | | | |
|---|---|---|---|
| 2,817,334 | 12/1957 | Sajecic | 137/DIG. 9 |
| 3,362,429 | 1/1968 | Volsk | 137/494 |
| 3,498,312 | 3/1970 | Geiszler | 137/494 X |
| 3,633,611 | 1/1972 | MacNiel | 137/494 |
| 3,904,174 | 9/1975 | Giese | 251/251 X |

Primary Examiner—Harold W. Weakley
Attorney, Agent, or Firm—Christel & Bean

[57] ABSTRACT

An air flow regulator is provided which may be utilized in diving or scuba equipment. A diaphragm urges a pivoted leg assembly into pivoted motion and the latter, being coupled to a valving means, provides controlled passage of air to the user. A sloped, rolling contact is provided between the pivoted leg portion and a stationary mounting means therefor so that a variably positioned pivot point is provided along the longitudinal length of the leg portion as it experiences various degrees of pivoted movement whereby the leg portion provides correspondingly various degrees of mechanical advantage for moving the valve means of the assembly. The various mechanical advantages correspond to the various degrees of effort required for different selected valve openings so that the same amount of user effort is necessitated for all positions of valve opening.

7 Claims, 5 Drawing Figures

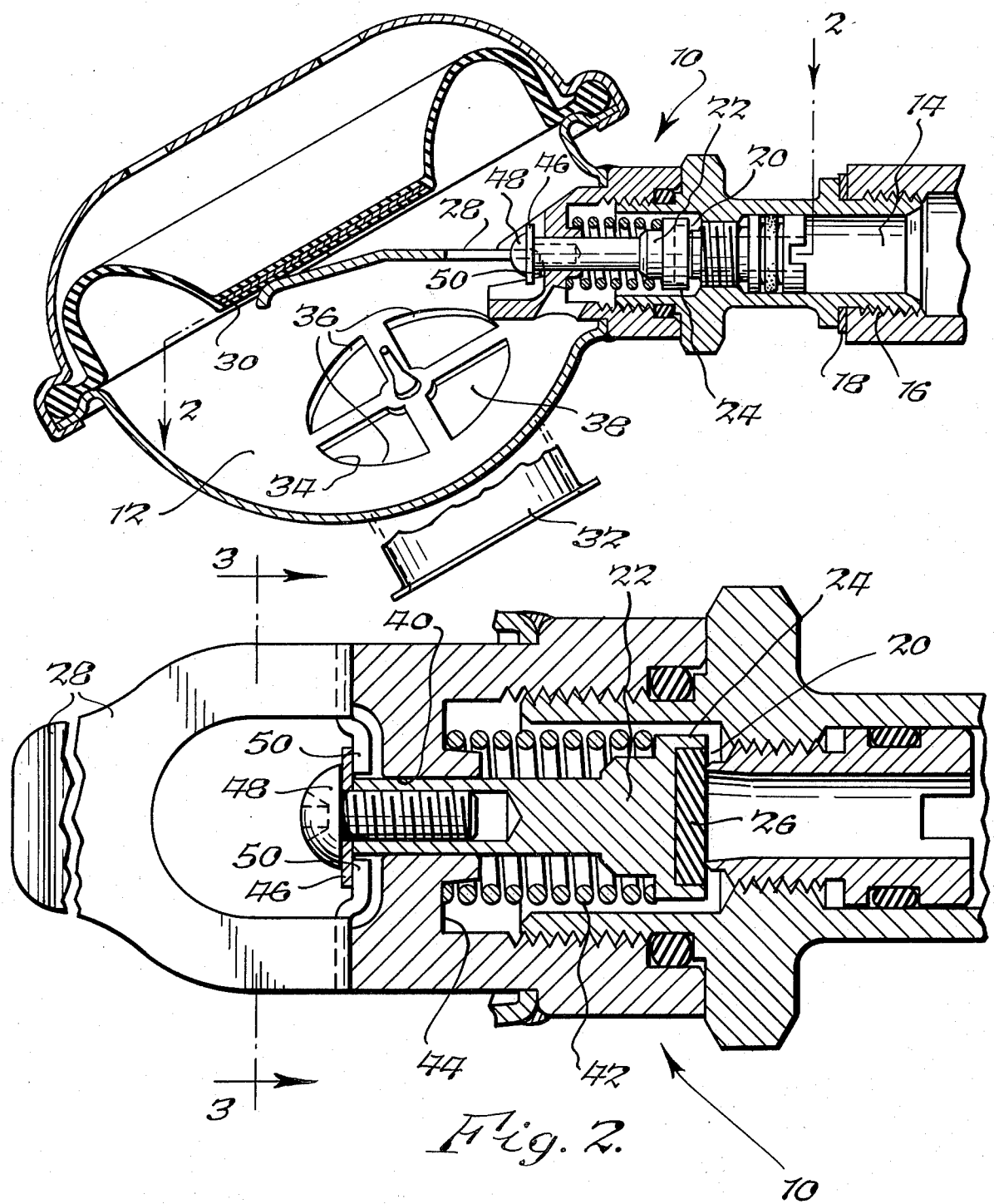

FLOW REGULATOR VALVE

BACKGROUND OF THE INVENTION

This invention relates generally to air or fluid flow regulators, commonly known as "demand-type flow regulators" which operate or allow passage of air in response to a respiration demand signal fo a user employing the flow regulator in conjuncton with breathing equipment. More specifically, the present invention provides a means whereby the user's respiration demand signal will be substantially the same for either initially allowing the passage of inlet air or to maintain a continued flow of inlet air.

As stated, regulators for passing breathable air in response to a demand signal are commonly known as "demand-type flow regulators". Such regulators find particular use in surface and underwater breathing equipment such as utilized in firefighting, intensive care breathing apparatus for hospital use, and sports applications such as diving equipment. Such fluid or flow regulators are generally located in the air supply line from a tank of compressed air to the mouthpiece or face mask of the breathing equipment. Basically, demand-type regulators include a control valve which is normally closed to block ar flow. By inhaling through the mouthpiece, or through a corresponding port in the face mask, the control valve is momentarily opened to pass a quantity of air from the supply ank into the lungs of the user or operator. Unfortunately, the foregoing operation does not always occur with maximum efficiency. In practice, it is often difficult to open the control valve and to draw a sufficient quantity of air through the regulator. This initial effort required by the user to open a control valve is referred to as "the cracking pressure" in the unit. However, as the control valve of a flow regulator is opened, it has been found that the air flow therethrough develops venturi effects on the assembly employed to open such control valve which venturi effects tend to reduce the effort needed by the user to maintain the control valve in an open disposition. It is to be understood that this variance in effort required of the user exists at various levels of air pressure in the supply tank and even in the presence of a pressure reduction means which might be disposed between the supply tank and the inlet to the flow regulator whereby a substantially constant supply pressure of air is provided to the flow regulator inlet.

For a scuba diver using underwater breathing apparatus employing a regulator of such unbalanced design wherein he must exert relatively greater effort to initiate air supply than to maintain an air supply, a serious safety problem is presented and is particularly accentuated at appreciable water depths where physical exhaustion can be a rapid process. At such depths, the diver requires increased volumes of air. His suction effort naturally increases in an attempt to increase the flow of air through a regulator. This increased effort, in view of the "cracking resistance" found in prior art devices accelerates his exhaustion and causes a demand for even greater volumes of air. At this point even stopping to rest while still under pressure will not ease the demand for great volumes of air and the diver begins to gasp for breath. To prevent drowning, the diver must then either return to shallower water where smaller volumes of air are required for normal breathing or to the surface. In such situations, it will be obvious to those familiar with underwater diving that a safety hazard is presented should a diver return to shallower water in too rapid a manner.

The prior art includes various types of demand-air regulators for breathing equipment. Generally such structures include a flexible, respiration-responsive diaphragm which abuts a pivoted lever arm which in turn is coupled to an air inlet valve in the air regulator structure. Upon inhalation of the user, the diaphragm is flexed so as to pivot the aforesaid lever arm which in turn opens the air inlet valve. However, the pivoted arms in the prior art include substantially fixed pivot points so that the mechanical advantage employed to open the inlet valve is the same during initial opening of the valve and at later stages of valve opening. Such a constant mechanical advantage therefore reflects a relatively high effort on the part of the user to overcome the initial "resistance".

SUMMARY OF THE INVENTION

One object of the present invention is to provide a breathing demand regulator especially designed for ease and simplicity of manufacture while retaining dual capabilities of positive pressure control and reliable demand breathing.

It is another object of the present invention to provide a breathing demand regulator which is compact in design and reliable in operation.

Still another object of the present invention is to provide an air flow regulator having an actuating mechanism which requires small amounts of user effort to initially open the air inlet valve of the regulator thereby overcoming the initial "cracking resistance" and to subsequently maintain and further open the air inlet valve.

Yet another object of the present invention is to provide an air flow regulator having a stable flow of air therethrough which is not subject to free floW conditions.

In summary, the present invention provides an air flow regulator having a main body and air chamber therein. An air inlet valve means and air discharge port are further provided in communication with the aforesaid chamber area for providing fresh air to the user through the unit and for discharging the user's exhaled air, respectively. A valve actuator is further incorporated into the main body for opening and closing the inlet valve means. The valve actuator includes a pivoted leg portion which is received in pivoted engagement against a mounting means therefore. An extension portion on the pivoted leg abuts a respiration responsive diaphragm and is movable therewith to urge the aforesaid leg portion into pivoted movement. The leg portion is in turn connected or coupled to the inlet valve means which is opened and closed in correspondence to the pivoted movement of the leg. One of the contacting surfaces between the leg portion and its mounting means is sloped with respect to the other so that the pivot point of contact therebetween varies along the longitudinal length of said leg portion in correspondence to pivoted movement experienced by said leg portion whereby the leg provides correspondingly various degrees of mechanical advantage for moving said inlet valve means.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 1 is a vertical sectional view of the air flow regulator of the present invention;

FIG. 2 is a fragmentary, enlarged view taken about on line 2—2 of FIG. 1 looking downwardly of the flow regulator of the present invention;

DETAILED DESCRIPTION OF THE INVENTION

Figure 3:
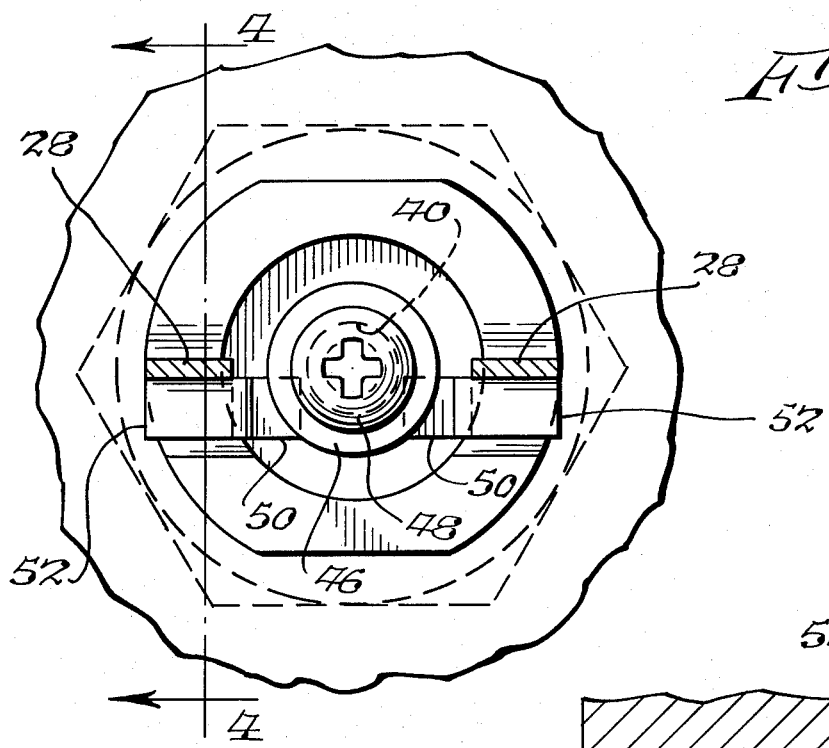
FIG. 3 is a fragmentary view in section taken about on line 3—3 of FIG. 2 of the air flow regulator of the present invention.

Referring now in detail to the illustrative embodiments in the accompanying drawings, there is shown in FIG. 1 an air flow regulator having a main body generally shown as 10 which further includes an air chamber generally indicates as 12. An air inlet means is provided through passage 14. The leading end of passage 14 includes a threaded end portion 16 and a gasket means 18 adapted to receive a supply conduit from an air supply means. The inlet passage 14 leads through a valve seat portion 20 to be more fully described hereinbelow. A valve means 22 is disposed in a sliding disposition within the main body 10 and includes a valve head means 24 with the latter including a recessed gasket means 26 for abutting the valve seat means 20 in a sealing relationship. The valve 22 is in turn coupled to a valve actuator element generally shown as 28 with the free end of the latter being in biased abutment with a respiration-responsive diaphragm 30. As further shown in FIG. 1, a mouthpiece 32 is provided on the main body 10 to communicate with air chamber 10 through the sidewall thereof. In addition, an air discharge port 34 is provided for discharging exhaled air of the user outwardly therethrough. In this regard, a plurality of openings 36 are defined in the sidewall of the air chamber and are covered on the outer surface thereof by a flexible gasket means 38.

As shown in FIG. 2, the valve 22 slides in a bore 40 of the main body of the regulator. The valve head portion 24 is shouldered to receive in abutment thereagainst a biasing or spring means 42 with the other end of spring 42 abutting against the main body of the regulator on land portion 44. In this manner the valve 22 and valve head 24 are normally biased to the right so that the gasket insert 26 is normally seated against the valve seat 20.

The left hand portion of the valve 22 includes a washer means 46 attached thereto by means of a stud 48 which is engaged within the lefthand end portion of the valve. The washer is in turn disposed in sliding abutment with the cantilevered coupling elements 50 which depend from the actuator 28.

As viewed in FIG. 3, the cantilevered coupling elements or coupling means 50 extend inwardly to engage the underside of washer 46 and are formed as part of the pivoted leg portions 52 of the actuator.

Figure 4:
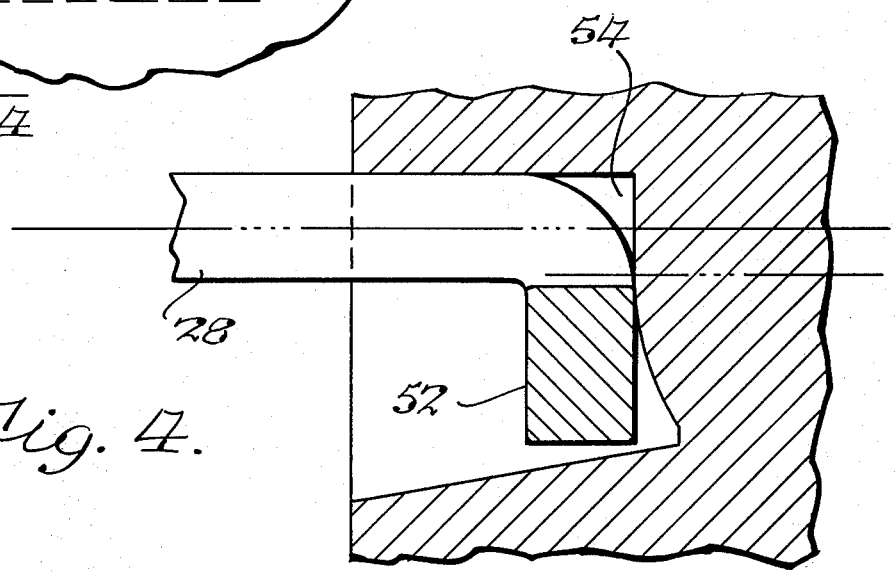
FIG. 4 is a fragmentary, enlarged view of the pivoted leg portion and mounting means therefore of the present invention as taken about on line 4—4 of FIG. 3.

As further seen in conjunction with FIG. 4 the pivoted leg portion 52 is received in a mounting groove or channel means 54 and is pivoted in contact thereagainst. The leg portion 52 includes, in addition to the coupling extension element or means 50 seen in FIG. 3, a cantilevered extension means 28 as seen in FIG. 1.

As viewed in FIG. 4, the leg portion 52 has a substantially flat surface portion in rolling or pivoted contact with the mounting means surface 54, the latter being sloped away from the free end of the pivoted leg portion. By such an arrangement, the point of contact between leg portions 52 and mounting means 54 moves downwardly as viewed in FIG. 4 as the leg portion 52 is pivoted or rotated in a counterclockwise direction.

Figure 5:
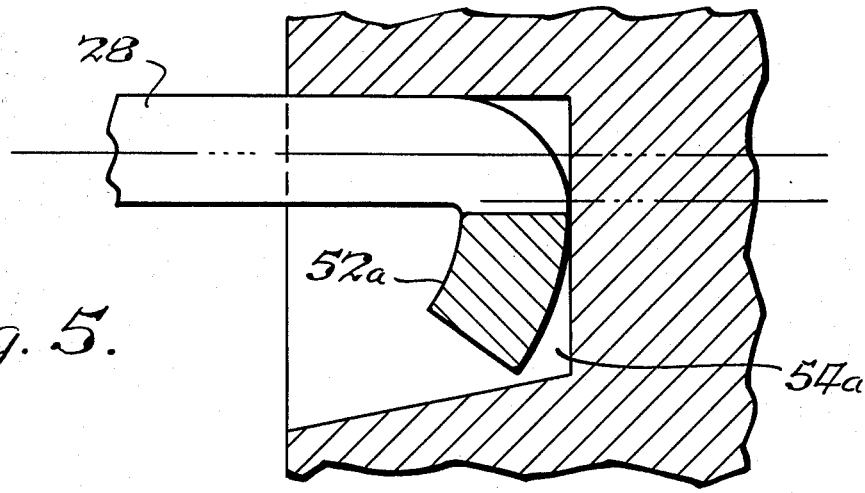
FIG. 5 is an alternative embodiment to that view shown in FIG. 4.

As viewed in FIG. 5 an alternative embodiment is shown for the leg portion 52a and the mounting means or channel 54a. As shown in FIG. 5, the contact surface of the leg portion 52a is sloped away from a substantially flat contact surface on the mounting channel 54a. As described in FIG. 4, as the leg portion 52a in FIG. 5 is pivoted or rotated in a counterclockwise direction, the pivot point of contact between the contact surfaces of the leg portion 52a and mounting channel 54a moves downwardly due to the relationship of sloped surfaces on the leg portion and the substantially flat surface on the mounting groove.

The present invention operates in the following manner. Prior to inhalation through the mouthpiece 32 by a user of the flow regulator, the valve 22 and associated valve head 24 are biased to the right by spring means 42 so that valve head is in sealed engagement on valve seat 20. In this disposition, the attached washer means 46 urges the coupling elements 50 to the right as seen in FIG. 2 and urges the extension portion 28 to assume the disposition seen in FIGS. 4 and 5. In such a disposition, the cantilevered free end of the extension portion 28 as seen in FIG. 1 abuts the diaphragm means 30.

When air is desired by the user of the present invention, inhalation through mouthpiece 32 tends to draw diaphragm 30 inwardly into the chamber 12 which has the effect of urging the extension portion 28 and connected leg portions 52 to pivot or rotate in a counterclockwise direction as seen in FIGS. 1, 4 and 5. As previously described hereinabove, increased axial force is needed to initially unseat the valve head 24 from the valve seat 20 in order to overcome the "cracking resistance". Therefore, the mechanical advantage provided by the leg portion 52 or 52a and the extension portion 28 is maximized during initial counterclockwise rotation thereof since the pivot point of contact as seen in FIGS. 4 or 5 is relatively close to the centerline of the extension 28 along which pivoting force is transmitted to the coupling portions 50 whereby the latter pivot and slide along the surface of the washer means 46 to urge such washer means and attached valve 22 to the left as seen in FIG. 2. After initial opening of the inlet valve, the inlet air flow creates a venturi effect under extension 28 as seen in FIG. 1. Such venturi effect creates an area of reduced pressure so that extension 28 may be more easily pivoted counterclockwise as seen in FIG. 1. Accordingly, as the venturi effect increases through increased opening of the inlet valve the pivot point between the pivot leg and mounting means as seen in either FIG. 4 or 5 moves downwardly away from the center line of extension 28 so that the mechanical advantage is reduced which offsets the positive effect created by the venturi flow beneath extension 28. Of course, the reverse occurs as the inlet valve is closed i.e. mechanical advantage increases as the inlet valve tends to close and the venturi effect correspondingly decreases.

From the foregoing, it is apparent that the objects of the present invention have been fully accomplished. As a result of this invention, a greatly improved actuator is provided for air flow regulators wherein substantially uniform effort is required of the user to either initially open the inlet valve or to maintain such inlet valve in a subsequent opened condition through variance of the mechanical advantage provided by the actuator described hereinabove.

I claim:
1. A fluid flow regulator comprising:
   a main body having a chamber therein, an inlet means to said chamber, and a fluid discharge means from said chamber,
   a valve seat means in said chamber, said valve seat means being in communication with said inlet means for receiving fluid from a fluid supply,
   a valve means in said chamber, said valve means including a valve head means supported within said chamber for movement to and from said valve seat means to respectively block and unblock fluid flow through said inlet means,
   biasing means for normally urging said valve head against said valve seat to block fluid flow, and
   valve actuator means coupled to said valve means for selectively moving said valve means to block and unblock fluid flow, said valve actuator means including at least one pivoted leg portion for providing movement to said valve means and a mounting means disposed on said main body, said mounting means receiving said leg portion in pivoted contact thereagainst and one of the contacting surfaces of said leg portion and said mounting means being of curvilinear shape and the other being of relatively flat shape when viewed in cross-section with respect to one another so that the pivot point of contact therebetween varies along the longitudinal length of said leg portion in correspondence to pivoted movement experienced by said leg portion whereby said leg portion provides correspondingly various degrees of mechanical advantage for moving said valve means, said mechanical advantage being relatively the greatest when said valve means is initially moved away from said valve seat means and being relatively less as said valve means is moved farther away from said valve seat means.

2. A fluid flow regulator as set forth in claim 1 wherein said biasing means comprises a spring disposed with one end abutted against said main body and the other end mounted on said valve for normally urging said valve head against said valve seat.

3. A fluid flow regulator as set forth in claim 1 wherein said valve means and said valve head means are disposed within said chamber for reciprocally sliding in an axial direction towards and away from said valve seat means.

4. A fluid flow regulator as set forth in claim 3 wherein said leg portion is coupled to said valve means and pivots in a plane substantially parallel to the longitudinal axis of said valve means.

5. A fluid flow regulator as set forth in claim 4 wherein said valve actuator means includes an extension means connected to said leg portion for urging said leg portion into pivoted movement, and further including a respiration-responsive diaphragm defining a wall portion of said chamber and being disposed in contact with said extension portion so that opening and closing of said valve means is controlled by the responsive movement of said diaphragm means.

6. A fluid flow regulator as set forth in claim 5 wherein the surface of said leg portion in contact with said mounting means is substantially flat and wherein the opposing contact surface of said mounting means is curvilinear.

7. A fluid flow regulator as set forth in claim 5 wherein the surface portion of said leg portion in contact with said mounting means is curvilinear and wherein the opposing contact surface of said mounting means is substantially flat.

* * * * *

UNITED STATES PATENT AND TRADEMARK OFFICE
CERTIFICATE OF CORRECTION

PATENT NO. : 3,991,785

DATED : November 16, 1976

INVENTOR(S) : Joseph C. Trinkwalder, Jr.

It is certified that error appears in the above-identified patent and that said Letters Patent are hereby corrected as shown below:

Change assignee's name from "Sherwood-Selpac Corporation"

to --Sherwood-Selpac Corp.--.

Signed and Sealed this

Twelfth Day of December 1978

[SEAL]

Attest:

RUTH C. MASON
Attesting Officer

DONALD W. BANNER
Commissioner of Patents and Trademarks